W. S. BABCOCK.
PLOW AND CULTIVATOR HANDLES.
No. 174,055. Patented Feb. 29, 1876.
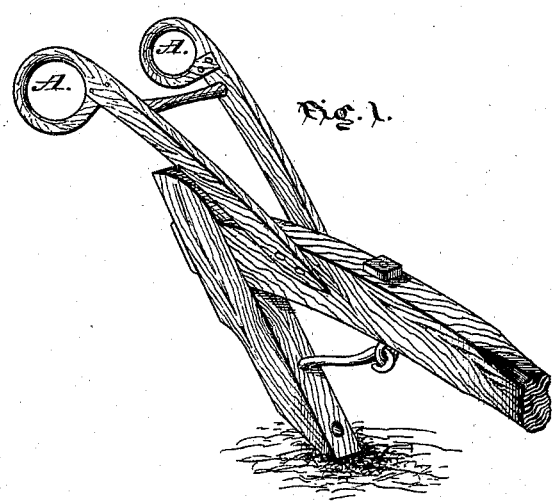
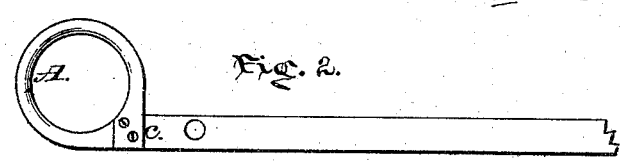
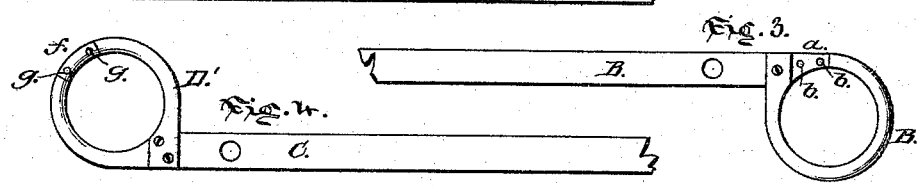
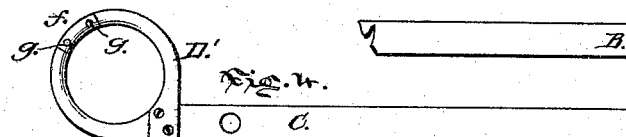
Attest:
Elisha A. Morgan
Lucius B. Morgan
Inventor:
William S. Babcock

UNITED STATES PATENT OFFICE.

WILLIAM S. BABCOCK, OF PLAINFIELD, CONNECTICUT.

IMPROVEMENT IN PLOW AND CULTIVATOR HANDLES.

Specification forming part of Letters Patent No. 174,055, dated February 29, 1876; application filed December 20, 1875.

*To all whom it may concern:*

Be it known that I, WILLIAM S. BABCOCK, of Plainfield, in the county of Windham and State of Connecticut, have invented certain new and useful Improvements in Plow and Cultivator Handles, which I desire to call "safety-handles." I do hereby declare that the following is a full, clear, and exact description of the same, reference being had to accompanying drawing, forming part of this specification, in which—

Figure 1 is a view in perspective, showing a plow having handles bent in the form of a circle at the place where we take hold to guide and manage the plow, cultivator, &c. Fig. 2 is a handle complete, made of wood, bent around and fastened with a bolt. Fig. 3 represents a handle made in two parts, B B', and connected with a metallic socket, a, the socket, with rivets b b, holding both secure, thereby using timber of two lengths instead of one, as in Figs. 1 and 2. Fig. 4 represents an ordinary handle, C, now in use, D' representing a bent piece secured to C, with socket f and rivets g g. Both the handles B' and D' may be made of wood, tubular metal, or their equivalents.

The object of my invention is to make and construct plow and cultivator handles, &c., in such a manner that they will be safe to man when using a plow or cultivator among rocks, stones, or other obstructions below or above the surface of the ground or soil, thereby avoiding many severe accidents, such as breaches, bruises, &c., on the body, made by the ordinary handle when the plow-point strikes an obstruction and the handles spring back and strike persons in the body, as is well known.

I claim as my invention—

The circular plow-handle, bent and secured as shown, substantially as and for the purpose set forth.

WILLIAM S. BABCOCK.

Witnesses:
 ELISHA A. MORGAN,
 LUCIUS B. MORGAN.